United States Patent [19]

Angelle et al.

[11] Patent Number: 4,493,034

[45] Date of Patent: Jan. 8, 1985

[54] APPARATUS AND METHOD FOR AN OPERATING SYSTEM SUPERVISOR IN A DATA PROCESSING SYSTEM

[75] Inventors: Phillip A. Angelle, Glendale; Marion G. Porter; James L. King, both of Phoenix, all of Ariz.

[73] Assignee: Honeywell Information Systems Inc., Phoenix, Ariz.

[21] Appl. No.: 434,344

[22] Filed: Oct. 14, 1982

[51] Int. Cl.³ .................................................. G06F 9/00
[52] U.S. Cl. ........................................ 364/200; 364/300
[58] Field of Search ................. 364/200 MS File, 300

[56] References Cited

U.S. PATENT DOCUMENTS

| | | | |
|---|---|---|---|
| 3,665,487 | 5/1972 | Campbell et al. | 364/200 |
| 3,843,953 | 10/1974 | Maley et al. | 364/200 |
| 4,366,537 | 12/1982 | Heller et al. | 364/200 |

Primary Examiner—Raulfe B. Zache
Attorney, Agent, or Firm—W. W. Holloway, Jr.; L. J. Marhoefer; N. Prasinos

[57] ABSTRACT

Apparatus and method for a supervisor for data processing system capable of utilizing a plurality of operating systems. The supervisor includes apparatus for identifying a condition in the data processing system requiring a different operating system. A reserved memory area associated with the currently active operating system is then addressed and register contents of a central processing unit are stored in the reserved memory area. The reserved memory of the operating system being activated is addressed and causes the address of the reserved memory of the operating system being activated, the data related to permitting the physical memory associated with the operating system being activated, contents of registers safestored in the reserve-memory and, data establishing the decor of the operating system being activated are entered in the central processing unit. The operating system to be activated is then enabled, and execution of permitted instructions by the second operating system is begun. The physical memory locations are determined by a real address through use of a paging mechanism permitting storage of portions of the operating systems in non-contiguous groups of locations while isolating the memory available to each operating system.

17 Claims, 6 Drawing Figures

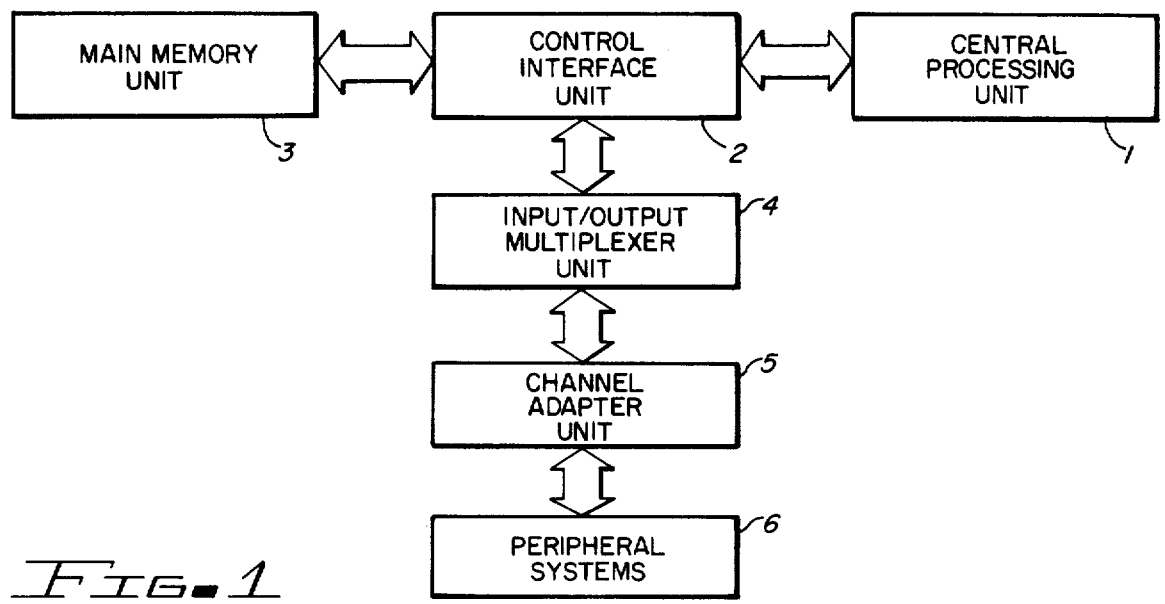
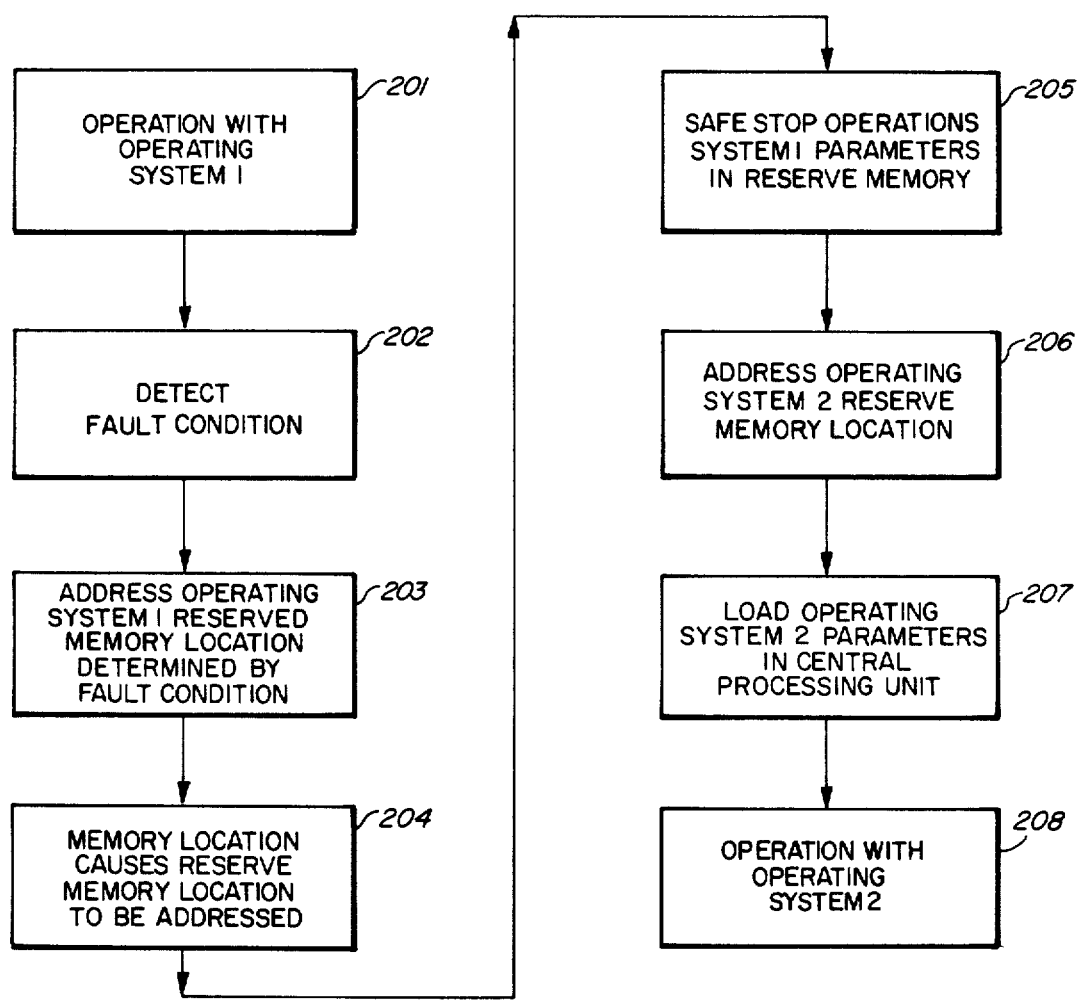

APPARATUS AND METHOD FOR AN OPERATING SYSTEM SUPERVISOR IN A DATA PROCESSING SYSTEM

BACKGROUND OF THE INVENTION

1. Field of the Invention

This invention relates generally to the control of the execution of instructions by a data processing system and more particularly to a data processing system capable of sharing a plurality of operating systems.

2. Description of the Related Art

It is known in the related art to provide a data processing system capable of execution of an instruction set under control of a single operating system. Each operating system has an interior decor, including a distinctive address formation and instruction processing characterists, that prohibit easy portability of operating systems. In order to utilize a plurality of operating systems, it has been necessary to alter the operating systems or add additional apparatus to operate additional apparatus. In addition, it is frequently necessary to reinitialize the data processing system each time a different operating system was activated. Frequently, improvements in operating systems require a change in apparatus and can cause problems in data systems. In addition, fault procedures residing in the memory unit have the characteristics of a specialized operating system.

Therefore, the need has existed for a data processing system capable of sharing a plurality of operating systems.

SUMMARY OF THE INVENTION

It is therefore an object of the present invention to provide an improved data processing system.

It is a further object of the present invention to permit a data processing system to operate under control of a plurality of operating systems.

It is a particular object of the present invention to permit the isolation of a pluralilty of operating systems.

It is another particular object of the present invention to ensure that unpermitted instructions are not executed by a currently active operating system.

It is yet another object of the present invention to provide a procedure for terminating operation of a currently active operating system and initialize operation of a different operating system.

The aforementioned and other objects of the present invention are accomplished by providing apparatus which will support the execution of instructions from a plurality of operating systems. Apparatus is also provided to isolate the operating systems and to ensure that only the instructions of the currently active operating system are executed. A memory space, unavailable to the plurality of operating systems is available for each operating system to permit an orderly exchange of operating systems.

These and other features of the invention will be clear upon reading of the specification along with the figures.

BRIEF DESCRIPTION OF THE DRAWINGS

FIG. 1 is a block diagram of a data processing system.

FIG. 2 is a flow diagram of the transfer of control of a data processing system from a first operating system to a second operating system.

DETAILED DESCRIPTION OF THE PREFERRED EMBODIMENT

Figure 3:
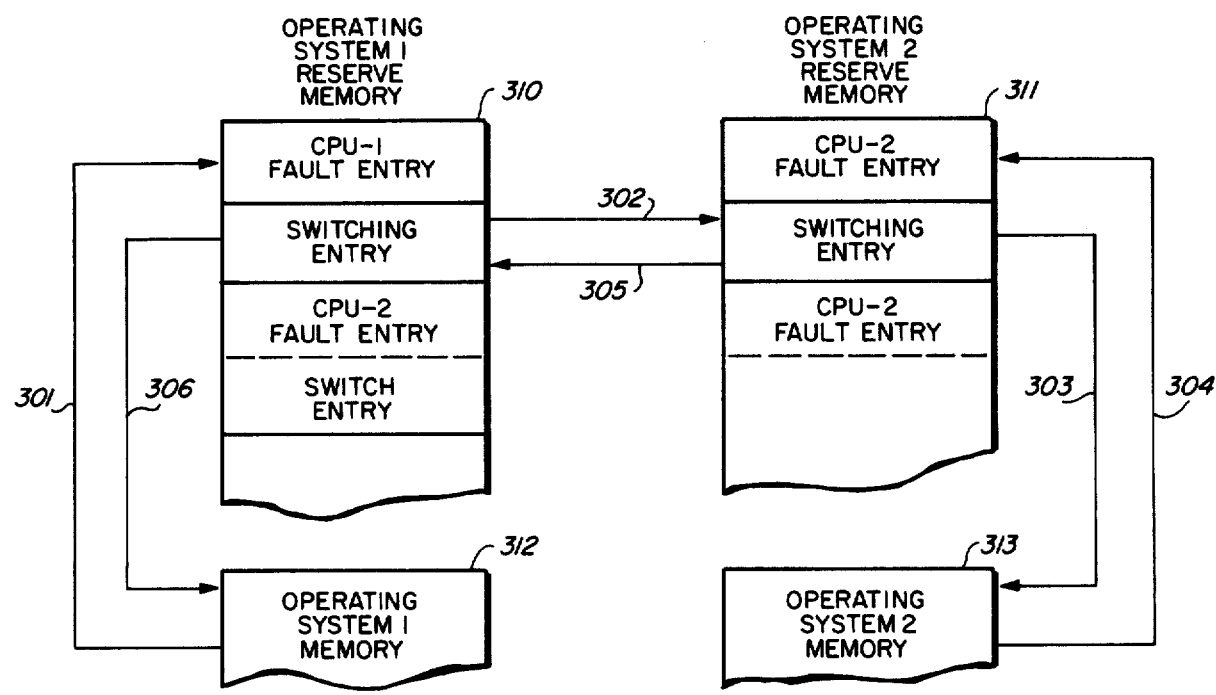
FIG. 3 is a schematic diagram of the use of selected memory files in transferring from a first operating system to a second operating system.

Referring to FIG. 1, the central processing unit 1 is the principle portion of the data processing unit for the manipulation of information signal groups. The central processing unit includes a central unit for sequencing the entire unit and further includes a cache unit and an instruction unit. The cache unit obtains instruction signal groups and data signal groups from main memory unit 3 through the control interface unit 2. Instruction signal groups are retained in an instruction cache, operand signal groups in an operand cache and paging information in a paging buffer. The instruction unit stores prefetched instructions and signal groups in an instruction stack. The instruction represents the current instruction stream and prefetch alternate streams or indirect words predicted by the batch table. The instructions are decoded and operand or branch target instruction addresses generated in a pipeline which accepts instructions for an instruction stack. The final stage of the pipeline sends instructions and operands to one of a group of specialized execution units. The pipeline, address adder and instruction stack can be considered another logical execution unit, which handles transfer class instructions as well as instruction address, or state-related situations.

The main memory unit 3 provides the central processing unit 1 with the principle storage of information signal groups used by the central processing unit. The information signals are entered into or extracted from the main memory unit under control of the control interface unit 2.

The control interface unit 2 controls the transfer of information signals between the main memory unit 3, the input/output multiplexer 4 and the central processing unit 1. Thus, the control interface unit 2 prioritizes requests to the control interface unit and prioritizes the output to the input/output unit multiplexer. The control interface unit 2 provides a buffer unit for information signals transferred therethrough. In addition, the control interface unit 2 controls the queque for system interrupts under which words are stored in the main memory unit as well as other interrupt activity. The error detection and correction processes for data transferred into and out of the main memory unit 3 is contained in the control interface unit 2. The output interface unit also provides apparatus to insure that no block access conflict exists among hierarchy commands.

The input/output multiplexer 4 is utilized to satisfy the throughput requirements of the data processing system. The operating system prepares the required control words and assigns a buffer area for the data to be transferred. After the control words are prepared, the operating system initiates an input/output activity by issuing a connect instruction. The control interface unit 2 recognizes the connect instruction and passes the connect information to the input/output multiplexer controller. The input/output multiplexer retains the mailbox address and other pertinent information from the connect control word in the addressed channel's scratchpad memory and passes the connect command to the addressed channel in a channel adapter unit 5.

The addressed channel notifies the identified peripheral device that a channel program is waiting. After notification to the identified peripheral device, the channel adapter unit 5 requests the input/output multiplexer to pull the channel mailbox. In response to this request, the input/output multiplexer loads the first eight words of the channel mailbox into scratchpad memory. The channel program subsequently requests the input/output multiplex to 'move pointer forward'. In response to this request, the input/output multiplex performs a list service and sends the Instruction Data Control Word (IDCW) to the channel adapter unit 5. The first DCW of the channel program must be an IDCW. The channel adapter unit passes the IDCW to the peripheral device and, on demand from the peripheral subsystem, requests a data list service. Using the List Pointer Word (LPW) from the channel mailbox, the input/output multiplexer retrieves the next DCW. The input/output multiplexer retains the DCW in scratchpad memory and sends the pertinent information from the DCW to the channel adapter unit 5. With the DCW information, the channel adapter unit 5 requests the necessary data services to satisfy the channel program. The input/output multiplexer 4 executes the data services by maintaining the current DCW and PTW in scratchpad memory and performs any required list services for additional DCW's. After the channel program has been satisfied, the channel requests a status store service. The input/output multiplexer 4 places the termination status in the channel mailbox and restores the mailbox to memory. After completion of the status service, the channel requests a terminate interrupt service. In performing the service, the input/output multiplexer 4 interrogates the mailbox link word. If the interrupt inhibit bit is 'ON', the interrupt is not reported. If the interrupt inhibit bit is 'OFF', the interrupt is reported using the interrupt level specified in the mailbox link word. If the link word specifies a continuation, the input/output multiplexer issues a connect to the channel.

The channel adapter unit 5 provides the interface between the input/output multiplexer 4 and the peripheral subsystem 6. In addition to the activity described in relation to the input/output multiplexer, the channel adapter interface unit provides a logic implementation conversion, CML in the input/output multiplexer 4 and TTL in the channel adapter unit 5. The channel adapter unit 4 serves as a buffer device between the peripheral system 6 and the input/output processor, permitting the input/output multiplexer to transfer information efficiently and asynchronously with a multiplicy of peripheral systems 6.

The peripheral system 6 can be any of that typical subsystem such as magnetic tape units, disc storage unit, terminal interfaces, etc. The peripheral subsystems serve as mass storage devices and devices to provide external communication with the data processing system.

Referring to FIGS. 2 and 3, the steps in inactivating a currently active operating system (1) and activating another operating system is illustrated. In step 201, the data processing system is currently executing instructions under the control of operating system 1. A fault or interrupt condition for supervisor procedures is identified in step 202. The identified condition must be a preselected condition in which the result is an exchange of operating systems controlling the data processing system. The preselected fault or interrupt condition will cause a predetermined location in the reserved memory space of operating system 1 to be addressed indicated as step 203 in FIG. 2. This process is shown as path 301 from operating system 1 memory 312 to operating system reserve memory 301. The location in reserve memory has a series of steps, the most significant being the storage of register contents in the central processing unit, step 205, the register parameters will be stored in reserve memory so that upon restoration of operating system 1 as the currently active operating system, the data processing unit will be returned to this state. After execution of the fault entry programs, a location in switching entry section of the operating system reserve memory 1 is executed. The instructions in this location allow the operating system 2 reserve memory to be addressed in a location in the operating system 2 switching entry location, i.e., step 206. This transfer to operating system 2 is shown as path 302 in FIG. 3. The instructions in the switching entry portion of operating system 2 cause, in step 207, the stored parameters of operating system 2 to be entered in the appropriate registers in the data processing thus initializing the system or restoring the system to the last previous state of operating system 2. The final step 208 and path 303 transfers control of the central processing unit to operating system 2. In this manner, the control of the central processing unit 1 has been transferred from operating system 1 to operating system 2. In FIG. 3, paths 304, 305, and 206 illustrate the process by which control of the central processing unit 1 is transferred back to operating system 1. Also shown in FIG. 3 is the possibility that each operating system can control a plurality of central processing units. For that situation, the other central processing units will switch between operating systems in a similar manner.

Figure 4:
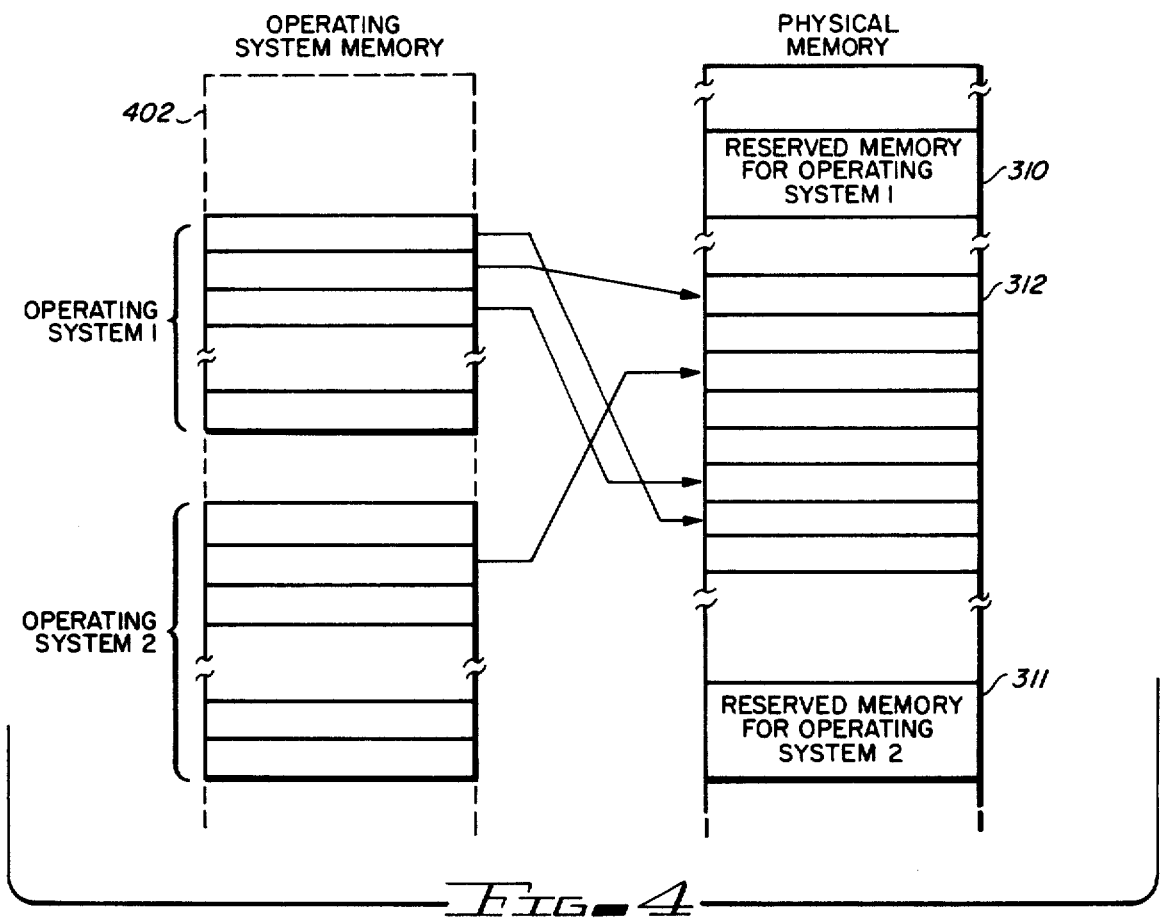
FIG. 4 is a schematic diagram demonstrating how memory is accessed by a first and a second operating system.

In dealing with a data processing unit sharing operating systems, it is necessary that memory space alloted to each operating system be inaccessible to the other operating systems. FIG. 4 indicates the manner in which this may be accomplished. A page table for the operating system is shown with locations associated with each of two operating systems. The address associated with operating system 1 will point to a group of locations in the physical memory 403. Similarly, the addresses stored in the group of locations associated with operating system 2 indicate a different group of memory locations. Thus, the physical memory 403 is divided in groups of memory addresses which are the result of a paging operation in the page table 402. Thus, operating system 1, or operating system 2, can be addressed in contiguous locations (i.e., for each operating system), but the groups of physical memory addresses associated with each page table address can be located throughout the physical memory address space. One advantage of the paging is that "holes" in the physical memory space (i.e., such as can result from an error in the memory unit) can be avoided when the page table is formed during an initialization process. FIG. 4 also illustrates the important feature that the reserved memory spaces 410 and 411 for operating system 1 and operating system 2 are unavailable to the operating system. Further-more, the reserve memory spaces can be located anywhere in the physical memory.

Figure 5:
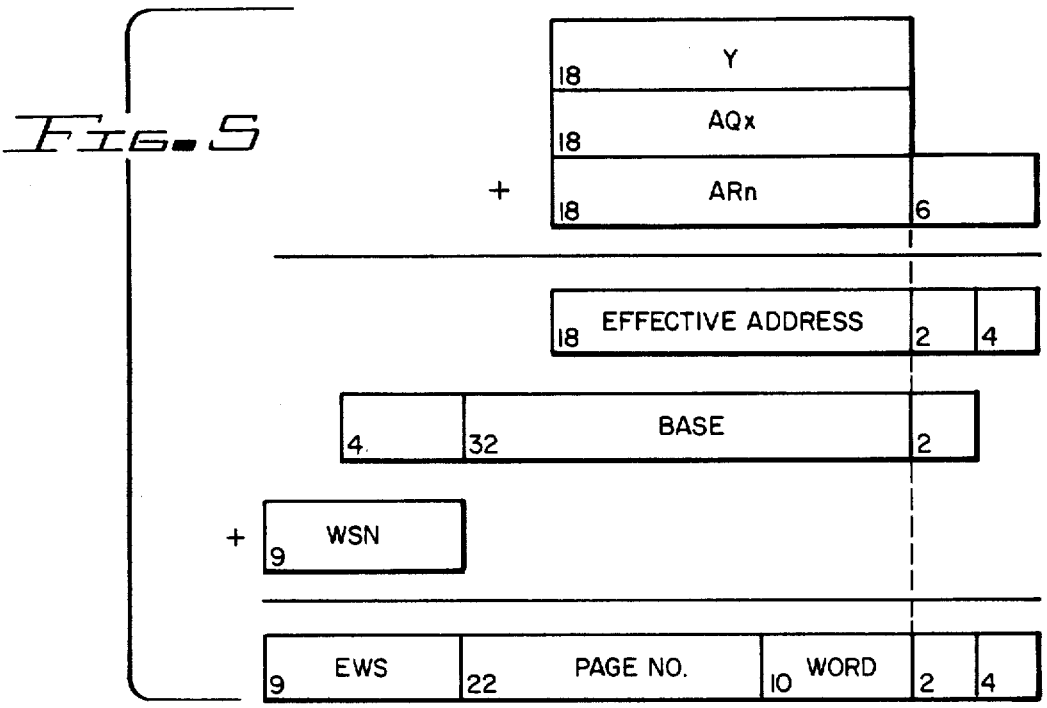
FIG. 5 is a block diagram showing the use of the supervisor base address register and the supervisor bound address register for isolation of the memory locations of an operating system.

Referring next to FIG. 5, the use of the supervisor base address and the supervisor bound for the isolation of operating system is shown. A supervisor page table directory 764 is provided during initialization, and provides the correspondence between an operating system address and an address in physical memory. During initialization or re-activation of each operating system, the supervisor base register 761 and the supervisor bound register 762 have data entered therein. In this preferred embodiment the first twelve bits of an address developed during normal execution of instruction provides an off-set from the base address. The base address is determined by the currently active operating system, i.e., each operating system will have a predetermined base address in the supervisor page table directory. The supervisor bound quantity will determine the number of page table directory location allocated to the operating system. Thus, when a 26 bit real address 763 is applied to the supervisor paging apparatus, the first 12 bits point to location 770, i.e., the address in the page address register plus the off-set defined by the highest order bit of the real address. The quantity in the bound register ensures that the location 770 is with contiguous directory location allocated to the operating system. The contents of location 770 are a 12 bit quantity which replaces the 12 bit off-set quantity in the address to provide an address in physical memory.

Figure 6:
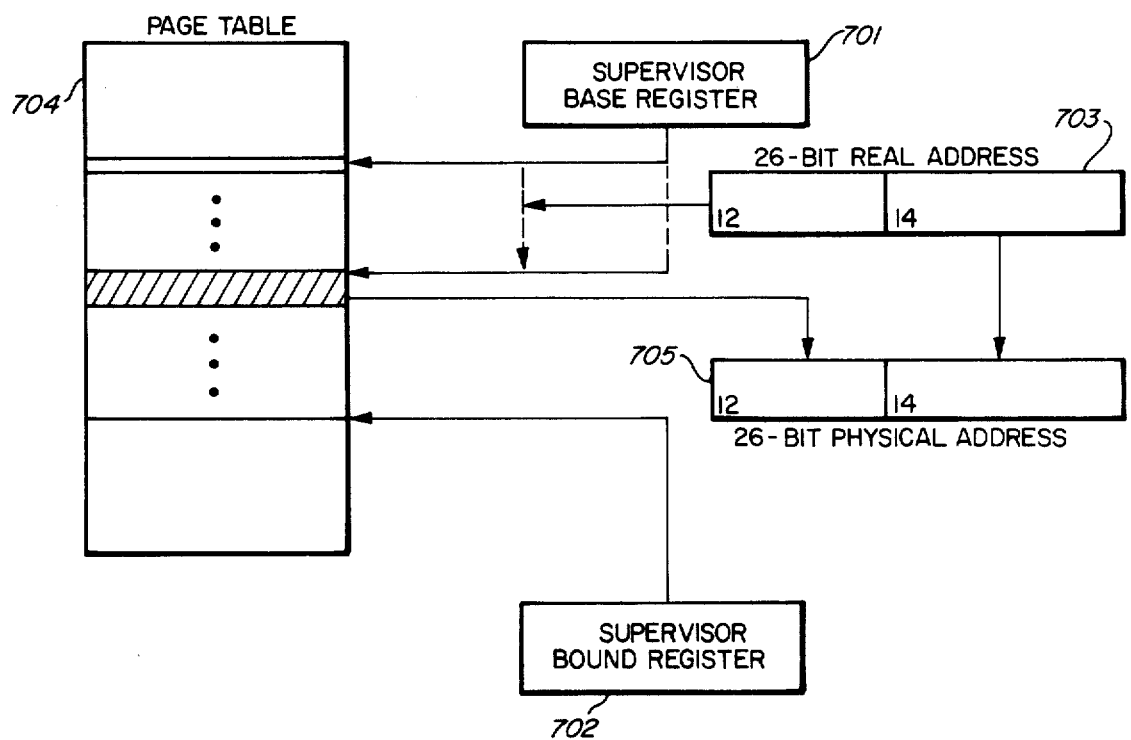
FIG. 6 is a block diagram of the format of reserved memory for each operating system.

Referring to FIG. 6, the general format of the reserved memory 650 for each operating system is shown. The supervisor switcher 651 portion of the reserved memory contains the program necessary for interruption or for initialization of an operating system. A more detailed description of this memory area will be given. Reserved memory portion labelled interrupt queues 652 are hardware loaded prioritized interrupts that are received by an operating system which is currently inactive. When the operating system becomes active, these queues will be interrogated and appropriate responses enabled. Hardware configuration 653 portion of the reserved memory is loaded upon initialization and provides a record of the resources (i.e., data processing system components) available to the operating system. The connect tables 654 portion of reserved memory provides a list of the resources currently available to the operating systems. Summarizing, the reserved memory is devoted to storing information necessary to maintain the isolation of the operating systems.

Referring to the supervisor switches 651 portion of reserved memory 650, the data stored therein provides the coded signals to process the change from one operating system to a second operating system. Included therein are the entry location (into the reserved memory switches) and the exit location from the reserved memory. Locations are included to safestore the contents of the central processing unit registers. Thus safestore locations are loaded by the initialization procedures, and when the operating system is activated, these locations provide the initialization. When the operating system asssociated with reserve memory is inactivated, these locations are filled with the contents of the central processing unit so that when the operating system is reactivated, the central processing unit will return to the state existing at the time it was inactivated. Also stored in the supervisor switches of the reserved memory are the quantities for the supervisor base and the supervisor bound. During initialization of a central processing unit, a supervisor page table direction is established. Each supervisor page generally consists of a multiplicity of normal pages. Moreover, the supervisor page table directory is used in the final translation from the address used by the operating system to the location in physical memory is performed through the supervisor page table. The supervisor base address points to the first in a series of sequential locations in the supervisor page table location. The operating system address contains an offset which indicates which location in the sequential supervisor page table directory the address refers. The supervisor bound ensures that off-set does not exceed the locations in the supervisor page table directory allocated to the operating system. If this occurred, the physical memory location addressed would be outside the area reserved for the operating system. The supervisor base and bound address are stored in registers in the central unit pipeline structure when the operating system is activated. The reserved memory supervisor switches includes a reserved memory base address and a bound. Again, these quantities are stored in the central unit pipeline structure (in the descriptor stack in the preferred embodiment) and provides the address of reserved memory when a predetermined fault is detected. Indeed in the preferred embodiment, the off-set from the base address in the reserved memory for handling of faults requiring attention of the supervisory processes is the same off-set from the operating base addressed as is used in the normal fault handling procedures. Also included in the reserved memory is the code allowing entry into the connect table. A memory location holds a quantity that will be loaded in a supervisor fault enable register. The quantity has a pattern which defines all the fault conditions that require a response from the supervisor procedures. When a fault condition is defined by signal pattern, this pattern is compared with the contents of the supervisor fault enable register to determine if the supervisor procedures or the normal operating procedures should be used to respond to the condition. A reserved memory location is used to store the faults pending register. These contents are re-entered into faults pending register when the operating system is reactivated so that conditions originally existing for the operating system are restored. Other reserved memory locations implement the use of a supervisor timer so that at the end of a predetermined number of clock cycles, the currently active operating system will receive a fault condition causing a new operating system to be activated. Thus one of the locations will have a (clock) count determining the time that the operating system will be active. Still another location contains data to be entered in the option register. This register contains signals control certain decor dependent variables. For example, a decor code is included. This code is compared in an operation code to ensure that the instruction is permitted in the decor of the operating system. Another quantity that can be stored is whether intermediate paging (not the supervisor paging) is employed. Other register locations include other decor dependent data that are loaded into the hardware apparatus to make the central processing unit decor consistent with the active operating system. For example, in virtual address formation, a working space number is required, while other operating systems may not require this quantity to be available to the operating system i.e., loaded in preselected register locations. Finally, an offset for the hardware configuration table is present.

The above summary is a partial list of data entered in the reserved memory. It will be clear that other data and procedures may be available for an operating system supervisor procedures.

A more detailed use of the supervisor procedures will now be given by way of illustration. When appropriate conditions occur in the central processing unit, such as the supervisor clock reaching a predetermined number of counts, the operating system reaching a point where it will voluntarily relinquish control of the central processing unit etc, a set of signals indicating a fault condition is entered in the fault register. The signals in the fault register are compared with signals that have been previously entered in the supervisor fault enable register. When a coincidence is detected, a different operating system is to be activated through the supervisor procedures, and a supervisor fault procedure is enabled. The supervisor fault procedure uses the reserved memory base address, stored in the central unit pipeline structure (i.e., in the descriptor stack) combined in a constant offset number to enter the reserved memory unit of the currently active operating system. The procedures beginning with the entry address cause the storage quantities, in registers in the central processing unit, in the appropriate locations in the reserved memory. In addition, the contents of the faults pending register are stored. These quantities allow the operating system being deactivated, to resume in the state when the operating system is reactivated. When this storage is complete, the reserved memory exits from a location that addresses an entry in the reserved memory of a second operating system. The second operating system loads the base and bound address of the reserved memory associated with the second operating system into the central unit pipeline structure (i.e., the descriptor stack) so that the instructions executed using the supervisor procedures can have the appropriate address formation. The supervisor base and bound is loaded in the final paging registers thus providing the mechanism for addressing only the physical memory associated with the second operating system and effectively isolating non-associated physical memory from the second operating system. The procedures of the reserved memory load the option register, which in addition to other decor-dependent information, provides the code that determines when a non-permitted instruction (e.g., because of incorrect decor requirements) has entered execution. The procedures of the reserved memory cause the fault pending register to be loaded and the decor-dependent quantities are entered in appropriate registers in the central processing unit. The central processing unit is now either initialized with respect to the second operating system or the previous state, from which the second operating system exited, has been reestablished. The reserved memory of the second operating system now executes a procedure by which the memory associated with the second operating system is entered and control of this data processing unit is now with the second operating system.

The above description is included to illustrate the operation of the preferred embodiment and is not meant to limit the scope of the invention. The scope of the invention is to be limited only by the following claims. From the foregoing discussion, many variations would be apparent to one skilled in the art that would yet be encompassed by the spirit and scope of the invention.

What is claimed is:

1. A method of providing a supervisor for a data processing system utilizing a plurality of operating systems comprising the steps of:
    (a) identifying a data processing system state requiring activation of a different operating system;
    (b) safestoring contents of registers defining a state of a central processing unit of said data processing unit in a reserve memory associated with a currently active operating system;
    (c) addressing a reserve memory associated with said different operating system,
    (d) entering in said state defining registers of said central processing unit an address of said different operating system reserve memory, an address in a page table directory, data in registers of said central processing unit establishing a predetermined state of said data processing system, and data establishing a decor for said central processing unit determined by said different operating system; and
    (e) initiating operation of said different operating system.

2. The method of proividing an operating system supervisor of claim 1 wherein said entering step further includes entering decor-defining quantities in said central processing unit.

3. The method of providing an operating system supervisor of claim 1 wherein said steps of identifying a data processing system state includes a step of comparing a fault condition with a pre-established fault enable quantity, said fault enable quantity having been transferred from said currently different reserve memory prior to activation of said associated operating system.

4. Apparatus for supervising a data processing system including a central processing unit and a memory unit utilizing a plurality of operating systems comprising:
    means for identifying a data processing unit state requiring activation of a currently inactive operating system;
    means for safestoring contents of registers defining a state of a central processing unit of said data processing unit in a reserve memory associated with a currently active operating system;
    means for addressing a reserve memory associated with said currently inactive operating system;
    means for entering in said state defining registers of said central processing unit quantities stored in said currently inactive operating system reserved memory;
    means for entering in registers of said central processing unit quantities related to an address of said currently inactive operating system reserve memory, and an address in a supervisor page table directory; and
    means for initiating operation of said currently inactive operating system.

5. The supervising apparatus of claim 4 wherein said supervisor page table directory includes addressing for groups of memory location in said memory unit, said supervisor page table address providing an entry location for a group of supervisor page table locations, said group of supervisor page table locations addressing locations in said memory unit allocated to said currently active operating system.

6. In a data processing system, apparatus for supervising a plurality of operating systems, each of said operating systems capable of controlling said data processing system, said supervising apparatus comprising:

detection means for identifying a state of said data processing system operating under control of a first of said operating systems;

first memory means associated with said first operating system, said first memory means being accessed by said data processing system when said state is identified, contents stored in said first memory means causing parameters associated with said first operating system to be stored in said first memory means;

second memory means storing data signals and parameters associated with a second operating system of said plurality of operating systems, said contents of said first memory means causing said data processing system to access said second memory means;

third memory means storing said second operating system; and addressing means for limiting access of said data processing system to areas in memory, contents from said second memory means limiting access of said data processing system to said third memory means, contents of said second memory means causing said data processing system to access said third memory means and begin execution of said second operating system.

7. The apparatus for supervising a plurality of operating systems of claim 6 wherein said first and said second memory means include interrupt tables and connect tables.

8. The method of providing a supervisory operating system for a plurality of operating systems comprising the steps of:

a. allocating to each of said plurality of operating systems an associated first group of memory locations, said first group of memory locations storing signal groups associated with associated operating system;

b. limiting access of said data processing system operating under control of a one of said plurality operating system to said associated first memory locations;

c. allocating to each of said plurality of operating systems an associated group of reserve memory locations, said reserve memory locations being inaccessible to said operating system;

d. identifying a preselected state of data processing system execution instruction under control of said one operating system;

e. accessing a first reserved memory location associated with said operating system by said data processing system, contents of said one reserved memory location causing parameters of said one operating system utilized by said data processing system to be stored in said one reserved memory;

f. transferring access by said data processing system to a second reserved memory location causing parameters of an associated second operating system to be entered into said data processing system; and g. transferring access of said data processing system to said associated group of memory locations for execution by said data processing system under control of a second operating system.

9. The method of providing a supervisory operating system of claim 8 wherein including the step between step e. and step f. of selecting a second operating system for controlling instruction execution of said data processing system.

10. Apparatus for supervising operation of a plurality of operating systems for a data processing system comprising:

execution means for executing instructions by said data processing system for said plurality of operating systems;

limiting means for limiting execution of instructions by said data processing system to a current operating system;

identification means for identifying preselected states of said data processing system, said identification means as a result of identification of a one of said preselected states causing said execution means to execute instructions stored in a group of memory locations associated with said current operating system; and switching means causing transfer from said group of memory locations associated with said current operating system to a group of memory locations associated with said predetermined next operating system, said switching means causing said next operating system to become a current operating system.

11. The supervising apparatus of claim 10 wherein instructions in said memory location associated with said current operating system cause parameters associated with said current operating system to be stored in said current operating system memory locations and entering parameters from said next operating system memory location into said data processing system.

12. In a data processing system including a plurality of operating systems, apparatus for causing a first operating system to be replaced by a second operating system, for controlling instruction execution in said data processing system, comprising:

first execution means for executing instructions by said data processing system in memory locations associated with said first and said second operating system, limiting means for limiting execution of instructions to memory locations associated with an operating system currently controlling execution of instructions;

second execution means for executing instructions in first and second reserve memory locations associated with supervisor-programs for said first and said second operating system respectively;

identification means for identifying a state of said data processing system, said identification means resulting in inactivation of said first execution means executing said current operating system instructions; and activation of said second execution for execution of instructions of a supervisor program associated with said current operating system.

13. The apparatus for causing a first operating system to be replaced by a second operating system in a data processing system of claim 12 wherein said supervisor programs include instructions for storing parameters of an associated operating system when said associated operating system has been executing instructions and includes instructions for entering parameters into said data processing system when an associated operating system is being activated.

14. The apparatus for causing a first operating system to be replaced by a second operating system in a data processing system of claim 12 wherein said current operating system includes instructions for addressing said supervisor program associated with an operating system to be activated.

15. In a data processing system capable of being controlled by a plurality of operating system programs, the method for controlling transfer of control of said data processng system from a first operating system to a second operating system consisting of the steps of:

executing instructions by said data processing system in memory locations associated with said first operating system;

limiting access by said data processing system to said first operating system memory location;

identifying a preselected state of said data processing system;

executing instructions by said data processing system in memory location reserved for a supervisor program associated with said first operating system;

executing instruction by said data processing system in memory locations reserved for a supervisor program associated with said second operating system, said second supervisor program identified by said first supervisor program; and executing instruction by said data processing system in memory locations associated with said second operating system.

16. The method for controlling transfer of control of said data processing system from a first operating system to a second operating system of claim 15 wherein said step of executing instruction of said first operating system supervisor program includes storing parameters of said first operating system and wherein said step of executing instructions of said second operating system supervisor program includes transmitting parameter associated with said second operating system to said data processing system.

17. In a data processing system capable of executing instructions under control of a plurality of operating systems, apparatus for controlling transfer of control from a first operating system to a second operating system comprising:

a plurality of memory means each associated with a one of said plurality of operating systems, a plurality of reserve memory means each associated with a one of said plurality of operating systems, execution means for executing instructions, wherein said execution means is currently executing instructions from said first operating system;

addressing means including parameter defining registers for addressing said first memory means; said parameter defining registers limiting said addressing means to accessing said first memory means; said addressing means storing addresses of said plurality of reserve memory means;

identification means for identification of at least one preselected state of said data processing system, wherein identification of said preselected state causes said addressing means to address said first reserve memory means, addressing said first reserve memory means causing execution of instructions by said first reserve memory means including storage of state defining parameters for said first operating system; said first reserve memory means causing said second reserve memory means to enter state defining parameters for said second operating system in said data processing system and parameters in said parameter defining registers of said addressing means for said second memory means, said execution means instructing execution of instructions for said operating system.

* * * * *

UNITED STATES PATENT AND TRADEMARK OFFICE
Certificate

Patent No. 4,493,034                                          Patented January 8, 1985

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is Phillip A. Angelle, Marion G. Porter, James L. King and Leonard Rabins.

Signed and Sealed this eleventh Day of November, 1986.

BRADLEY R. GARRIS,
*Office of the Deputy Assistant Commissioner for Patents.*

UNITED STATES PATENT AND TRADEMARK OFFICE
CERTIFICATE OF CORRECTION

PATENT NO. :  4,493,034    Page 1 of 4
DATED       :  Jan. 8, 1985
INVENTOR(S) :  Phillip A. Angelle, Marion G. Porter, James L. King
               and Leonard Rabins It is certified that error appears in the above—identified patent and that said Letters Patent is hereby corrected as shown below:

Column 4, line 12, delete "301" and insert therefor --310--; and

Column 4, line 35, delete "206" and insert therefor --306--.

The sheets of Drawings consisting of Figures 4, 5 and 6 should appear as per attached sheets.

Signed and Sealed this

Third Day of November, 1987

Attest:

DONALD J. QUIGG

Attesting Officer      Commissioner of Patents and Trademarks

UNITED STATES PATENT AND TRADEMARK OFFICE
CERTIFICATE OF CORRECTION

PATENT NO. : 4,493,034
DATED : Jan. 8, 1985
INVENTOR(S) : Phillip A. Angelle, Marion G. Porter, James L. King and Leonard Rabins It is certified that error appears in the above—identified patent and that said Letters Patent is hereby corrected as shown below:

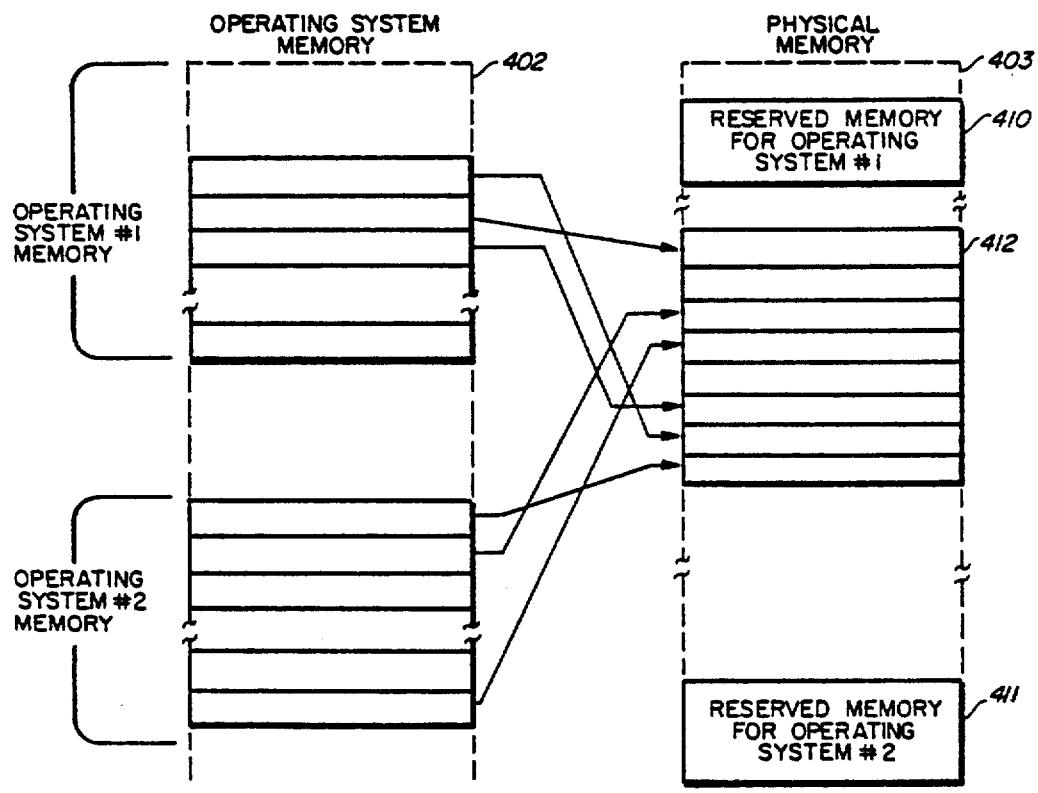

FIG. 4

UNITED STATES PATENT AND TRADEMARK OFFICE
CERTIFICATE OF CORRECTION

PATENT NO. : 4,493,034   Page 3 of 4

DATED : Jan. 8, 1985

INVENTOR(S) : Phillip A. Angelle, Marion G. Porter, James L. King and Leonard Rabins It is certified that error appears in the above—identified patent and that said Letters Patent is hereby corrected as shown below:

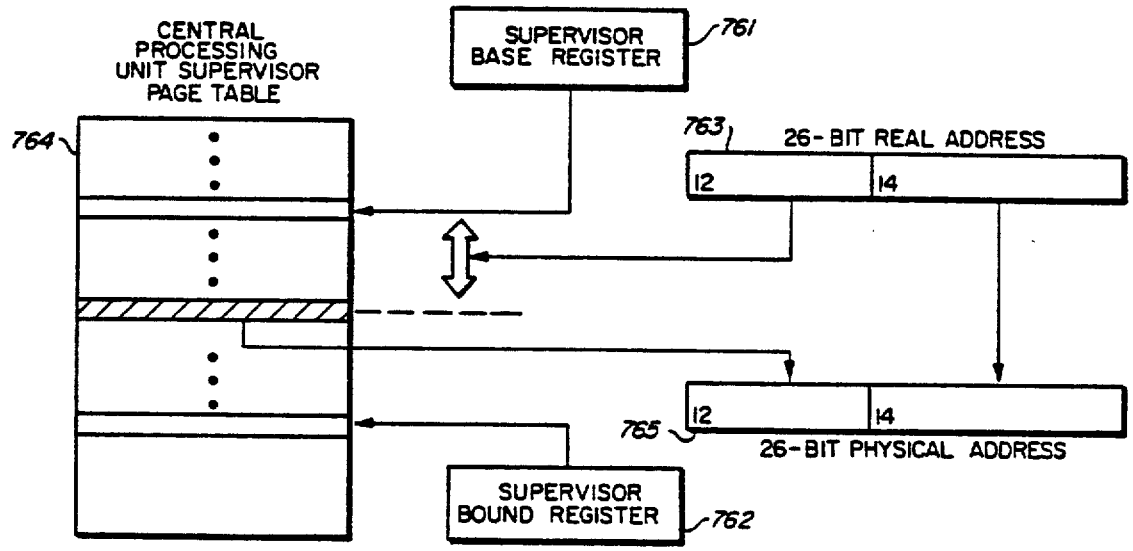

FIG. 5

UNITED STATES PATENT AND TRADEMARK OFFICE
CERTIFICATE OF CORRECTION

PATENT NO. : 4,493,034

DATED : Jan. 8, 1985

INVENTOR(S) : Phillip A. Angelle, Marion G. Porter, James L. King and Leonard Rabins It is certified that error appears in the above—identified patent and that said Letters Patent is hereby corrected as shown below:

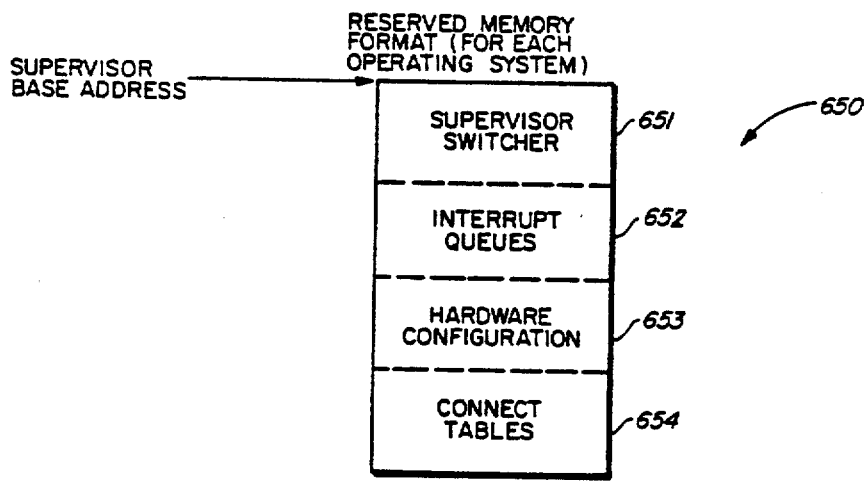

FIG. 6